United States Patent

[11] 3,545,697

[72] Inventors Cedric C. Sovia
  Forest Lake;
  Brian L. Birch, Mendota Heights,
  Minnesota
[21] Appl. No. 819,835
[22] Filed April 28, 1969
[45] Patented Dec. 8, 1970
[73] Assignee Minnesota Mining and Manufacturing
  Company
  St. Paul, Minn.
  a corporation of Delaware

[54] FILM REEL
  4 Claims, 3 Drawing Figs.
[52] U.S. Cl. ..................................................... 242/74.1
[51] Int. Cl. ..................................................... B65h 75/28

[50] Field of Search ........................................... 242/74.1,
  74.2, 74

[56] References Cited
  UNITED STATES PATENTS
  3,195,828 7/1965 Kuckhoff et al. ............. 242/74.1
  3,386,680 6/1968 Mouissie ...................... 242/74.1

Primary Examiner—Nathan L. Mintz
Attorney—Kinney, Alexander, Sell, Steldt & Delahunt ABSTRACT: A film reel to which film can be anchored to make the reel useful as a supply reel in certain automatic-rewind film-transport devices. The film is anchored within a recess in the hub of the reel by inserting the film through a slot in the hub rim and then gripping the film between a locking member and an internal hub wall against which the locking member can be moved and held.

PATENTED DEC 8 1970

3,545,697

INVENTORS
CEDRIC C. SOVIA
BY BRIAN L. BIRCH
Kinney, Alexander,
Sell, Steldt & DeLaHunt
ATTORNEYS

FILM REEL

BACKGROUND OF THE INVENTION

Recently developed motion picture projectors that automatically rewind film back onto the supply reel require a supply reel that has the trailing end of the film anchored to it. Thus, when all the film except the anchored end has been unwound from the reel, the film stretches taut and resists further advance by the film-transport mechanism. The film-transport mechanism includes mechanism that senses this resistance, and upon sensing it automatically stops the film-advance mechanism and energizes the rewind mechanism.

It has been suggested that the film be anchored to the supply reel at a point inside a recess within the hub of the reel. In this proposal the trailing end of the film is inserted into the recess through an axial slot in the cylindrical rim of the hub and laid over an axially extending channel formed on one of the internal walls of the hub. A pin is then wedged between the film in the channel and an internal hub wall opposite from the channel to anchor the film in place. The pin is generally of plastic and molded integrally with the reel. Film is returned to a consumer by a film processor on such a reel and if the consumer has an automatic rewind projector, he simply breaks off the pin and anchors the film.

It has been discovered, however, that the suggested film reel is not wholly satisfactory. After a period of use of the reel, the film tears at the point it enters the slot in the cylindrical rim. Then an additional length of the film must be inserted through the slot and anchored with the locking pin. Over a normal period of use of the reel, several lengths at the end of the film are torn away, and the film user is prevented from viewing a significant portion of the film that he once could view.

SUMMARY OF THE INVENTION

The present invention provides a film reel that will not prematurely sever the anchored end of the film. It is believed that film severs on the previous reels because the locking pin twists the film as the pin is wedged in place. Thus, instead of the edges of the hub rim that define the slot being perfectly transverse to the length of the film, they are slanted across the film. In addition, when the film is stretched at the end of unwinding, one edge of the film contacts one of the edges of the rim and the other edge of the film is raised out of contact with that edge of the rim. The result is that when the film is stretched taut at the end of film advance, the film is subjected to tearing forces rather than tension forces. Although photographic film is strong when subjected to tension forces, it is rather weak in resistance to tearing, and the tearing forces soon tend to sever it.

The present invention provides a reel and locking pin that does not twist film as it is anchored to the reel. As a result the film is subjected only to tension forces under which it can endure nearly indefinitely. In general, a film reel of the invention includes, first, a hub having the conventional axially extending (parallel to the axis of the reel) cylindrical rim on which film is wound. Internal walls of the hub define a recess within the hub that opens laterally as a narrow axial slot in the cylindrical rim, and film is introduced into the recess through the slot. A locking member is attached to a first internal hub wall portion inside the recess and extends between second and third internal hub wall portions, with an edge surface of the member and the second wall portion defining a space into which film can be inserted from the axial slot. A locking pin is adapted to be wedged between the locking member and the third wall portion to move the locking member into a position in which the edge surface abuts the second wall portion; film in the space is frictionally gripped between the edge surface and second wall portion and anchored to the reel. In a preferred form the reel is molded from plastic as one integral structure, with the locking pin being connected to the rest of the reel through a thin severable web.

A reel of the invention can be used either with or without the film anchored to it. When a consumer wishes to anchor film to the reel he does so quite quickly and conveniently. Since the film is contacted by an edge surface of a locking member moving substantially only normal to the film, rather than by a pin sliding against the film, the film is not twisted. The edges of the rim that define the axial slot remain substantially transverse to the film, and when the film is stretched taut at the end of film advance it is not damaged. The advantages of this structure are particularly important for photographic film which is rather weak against tearing forces, but it also can be used with other "film" materials, such as magnetic recording tape.

DETAILED DESCRIPTION

Figure 1:
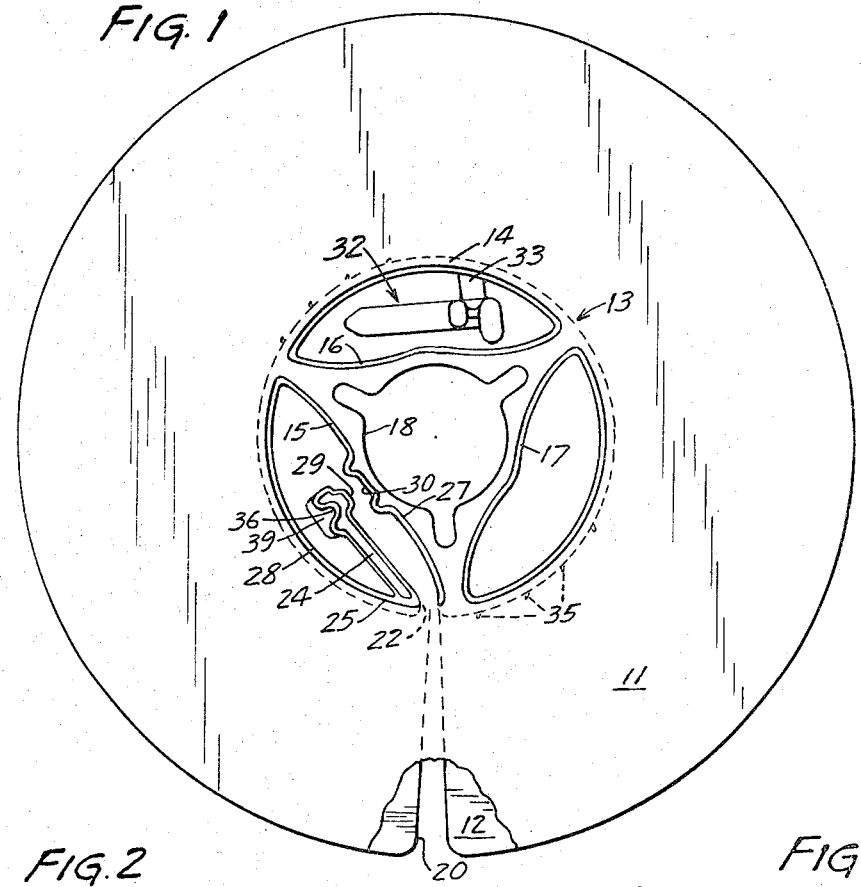
FIG. 1 is a plan view of a reel of the invention.

FIG. 1 is a plan view of an illustrative integrally molded plastic reel 10 of this invention. The reel 10 includes circular side flanges 11 and 12 attached to a hub 13. The hub 13 includes a cylindrical rim 14 on which film is wound and also includes internal walls within the hub that define recesses 15, 16, and 17 and a spindle hole 18. The flange 12 is formed with a threading slot 20 by which film can be conveniently inserted between the flanges 11 and 12. The recess 15 within the hub opens laterally as an axial slot 22 in the cylindrical rim, and the slot 22 is in registry with the slot 20 in the flange, so that film can be readily inserted into the recess 15.

A locking member in the form of a lever 24 within the recess 15 is integrally molded with the rest of the reel 10. The lever 24 is attached to a first internal hub wall portion 25, and the free end 26 of the lever 24 extends between second and third hub wall portions 27 and 28, respectively. The free end of the lever has an edge surface 29 configured as an axially extending ridge, and this edge surface is closely adjacent an axially extending channel 30 formed in the second wall portion 27. The lever 24 can be flexed into a position in which the edge surface 29 of the end of the lever abuts and mates with the channel 30 by wedging a pin between the free end of the lever and the third wall portion. Such a locking pin 32 is molded integrally with the rest of the illustrative reel 10 in the recess 16, being attached to the reel proper through a thin severable web 33.

Figure 2:
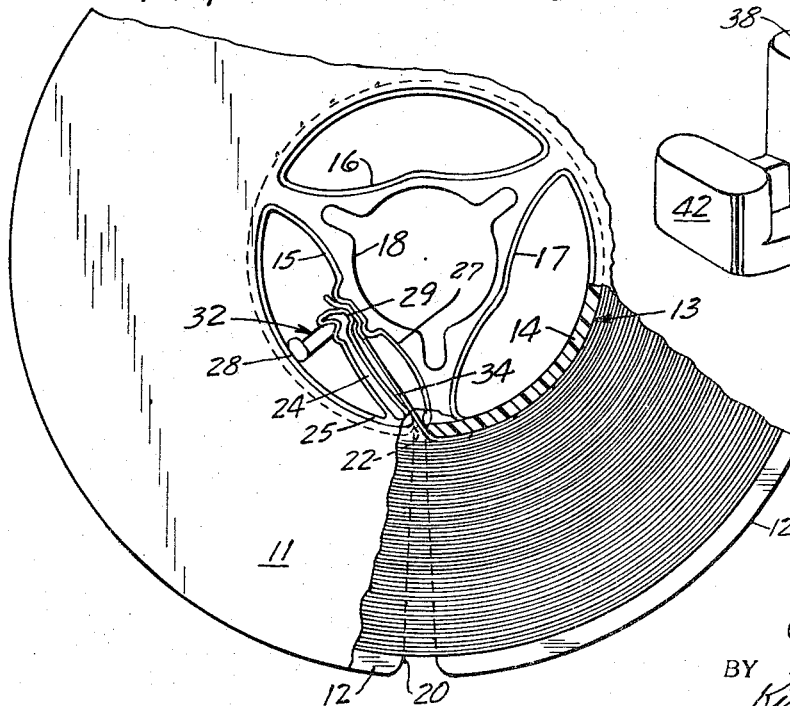
FIG. 2 is a partial plan view of the reel shown in FIG. 1.

Normally, a consumer receives a reel of the invention from a film processor with film, such as the film 34 shown in FIG. 2, wound on it and with the end of the film inserted through the slot 22. It is preferred to anchor film while it is at least partially wound on the reel, since then the end of the film between the lever 24 and wall portion 27 is assured of being initially untwisted. The detents 35 formed on portions of the cylindrical hub rim 14 assist in wrapping the film on the reel by preventing slippage of the film.

When a consumer wishes to anchor film to the reel 10 he severs the locking pin by breaking the web 33. If the film is not already inserted through the slot 22 and between the lever 24 and the wall portion 27, the consumer inserts it himself. Next he wedges the locking pin between the free end of the lever and the third internal wall portion 28, pressing the edge surface 29 of the end of the lever against the film and tightly gripping it between the edge surface and the channel 30. As shown, the edge surface 29 and channel 30 form a serpentine path for the film, and such an arrangement is preferred since it more securely anchors the film. The back surface of the lever 24 is formed with a groove 36 that mates with the pin 32 and helps position the pin in place.

Figure 3:
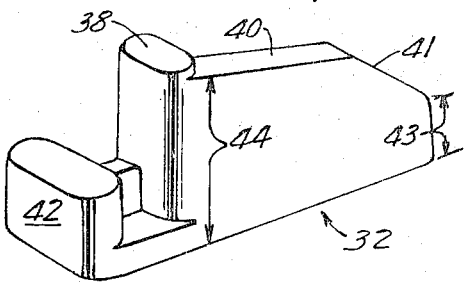
FIG. 3 is a perspective view of a locking pin for the reel of FIGS. 1 and 2.

Reels of this invention may be placed in magazines for use in projectors that require no film handling by an operator. The illustrative reel 10 includes a structural code that assures that the reel will be placed in such a magazine in the proper orientation. This structural code takes the form of an extension of the locking pin 32 above the flange 11. The pin 32 is formed with a projection 38 that abuts the cylindrical hub rim 14 when the pin is fully inserted, and the lever 24 is formed with a stop 39 at the base of the groove 30 that also limits the distance the pin 32 can be inserted into the reel. The pin 32 is shown in perspective in FIG. 3, and as shown is provided with a gradually tapered surface 40 and a sharply tapered surface 41 that adapt it to a wedging type action and facilitate insertion of the pin by a consumer. The head 42 of the fin is shaped to fit in the code recess in standard magazines.

In the illustrative reel shown in the drawings, the internal hub walls that define the recesses 15, 16, and 17 have a slight taper to facilitate removal of the reel from the mold. Despite this slight taper, the walls are regarded as being axial (parallel to the axis of the reel), and film locked between the edge surface 29 of the lever and the channel 30 is frictionally held without twisting.

The lever 24 is attached to an internal hub wall portion at a point near the slot 22 in the hub rim. For this reason, the lever and second hub wall portion 27 define a path requiring film inserted through the slot 22 to pass between the edge surface 29 of the lever and the channel 30. A similar path is provided by attaching the lever to the second hub wall portion 27 near the slot 22. In general, attaching the lever near the slot is preferred, but the lever can also be attached to a hub wall away from the slot 22 and extend toward the slot 22.

While the lever 24 is attached to the internal walls of the hub at only one point, locking members in reels of the invention are also attached at two points. For example, a bow-shaped web attached to the inside of the hub rim at the ends of the bow, with the web being spaced from the inside of the hub rim over its central portion but generally following the curvature of the inside of the hub rim, is used as the locking member in some reels of the invention. An edge surface near the center of the bow is adapted to mate with an axially extending channel such as the channel 30, and the web snaps against the channel to grip film with a toggle action, preferably initiated and supported by a locking pin wedged between the web and the inside of the hub rim.

Although the illustrative reel 10 is integrally molded, other reels of the invention are formed as separate components and then assembled. For example, in some embodiments the lever 24 is a separate element attached to an inner wall by a pin connection that allows the lever to pivot. In other embodiments, the locking pin 32 is not integrally molded with the rest of the reel. The pin need not be molded of plastic at all, but can take the form of a U-shaped wire spring, for example. However, the most economical procedure for forming the reel and locking pin is to mold them from a flexible, hard plastic as one structure, and such an integrally molded reel is easily used by a consumer.

One illustrative reel of the invention was integrally molded in the manner illustrated in the drawings from medium-impact polystyrene. The lever was about one half inch long and about one thirty-second inch thick in its web or flexible portion. Its edge surface 29 was spaced from the second internal hub wall portion 27 by about one sixteenth of an inch. The pin 32 had a depth at the end surface 43 shown in FIG. 3 of about one eighth of an inch, and at the widest point of the taper, 44 in FIG. 3, it was about one quarter of an inch deep.

We claim:

1. A film reel to which film can be conveniently anchored comprising: (1) a hub having (a) an axially extending rim on which film is wound and (b) internal walls that define a recess that opens laterally as a narrow axial slot in the cylindrical rim, (2) a locking member attached to a first portion of the internal walls of the hub and extending into the recess spaced between second and third internal hub wall portions, an edge surface of the locking member and the second wall portion defining a space into which film can be inserted from the axial slot, and (3) a locking pin adapted to be wedged between the locking member and the third wall portion to move the locking member into a position in which the edge surface abuts the second wall portion, whereby film in the space is frictionally gripped between the edge surface of the locking member and second wall portion and anchored to the reel.

2. An integrally molded plastic film reel to which film can be conveniently anchored comprising: (1) a hub having (a) an axially extending cylindrical rim on which film is wound and (b) internal walls that define a recess that opens laterally as a narrow axial slot in the cylindrical rim, (2) a locking lever integrally attached to a first portion of the internal walls of the hub and extending into the recess with its free end spaced between second and third internal hub wall portions, and with an edge surface of the free end of the lever and the second wall portion defining a space into which film can be inserted from the axial slot, and (3) a locking pin connected to the rest of the reel through an easily severed web and adapted to be wedged between the free end of the lever and the third wall portion to flex the lever into a position in which the edge surface abuts the second wall portion, whereby film in the space is frictionally gripped between the edge surface of the lever and second wall portion and anchored to the reel.

3. A reel of claim 2 in which the mating surfaces of the free end of the lever and the second wall portion form a serpentine path when the lever is pressed against the second wall portion.

4. A reel of claim 2 in which the lever is attached to an internal hub wall portion at a point near the axial slot in the cylindrical rim, whereby the lever and second wall portion define a path that requires film inserted through the slot to pass between the edge surface of the end of the lever and the second wall portion.